United States Patent
Kao et al.

[11] Patent Number: 5,901,067
[45] Date of Patent: May 4, 1999

[54] SYSTEM FOR INTERACTIVELY SELECTING AND ACTIVATING GROUPS OF ELECTRICALLY POWERED DEVICES

[75] Inventors: Kim Y. Kao, 19 Toscany, Irvine, Calif. 92714; Jimmy Hsiao, Ann Arbor, Mich.

[73] Assignee: Kim Y. Kao, Irvine, Calif.

[21] Appl. No.: 08/749,905

[22] Filed: Nov. 15, 1996

[51] Int. Cl.$^6$ .................................................. G06F 13/00
[52] U.S. Cl. ........................... 364/492; 307/38; 235/375; 235/382; 705/16; 364/140
[58] Field of Search ..................................... 364/140, 141, 364/146, 147, 480, 492, 222; 395/200.05, 750, 200.38; 307/38, 115; 902/23, 24; 235/381, 375, 380, 382, 382.5; 705/16, 17, 24

[56] References Cited

U.S. PATENT DOCUMENTS

| | | | |
|---|---|---|---|
| 3,705,384 | 12/1972 | Wahlberg | 340/149 |
| 4,312,035 | 1/1982 | Greene | 364/200 |
| 4,567,359 | 1/1986 | Lockwood | 238/381 |
| 4,624,578 | 11/1986 | Green | 368/10 |
| 4,700,296 | 10/1987 | Palmer, Jr. et al. | 364/401 |
| 4,703,412 | 10/1987 | Cunningham et al. | 364/140 |
| 4,808,841 | 2/1989 | Ito et al. | 307/11 |
| 4,831,242 | 5/1989 | Englehardt et al. | 235/382 |
| 4,902,881 | 2/1990 | Janku | 235/381 |
| 4,947,028 | 8/1990 | Gorog | 235/381 |
| 5,066,853 | 11/1991 | Brisson | 235/381 |
| 5,113,351 | 5/1992 | Bostic | 364/479 |
| 5,157,273 | 10/1992 | Mendendorp et al. | 307/147 |
| 5,162,989 | 11/1992 | Matsuda | 364/401 |
| 5,163,124 | 11/1992 | Yabe et al. | 395/750 |
| 5,164,609 | 11/1992 | Poppe et al. | 307/147 |
| 5,198,806 | 3/1993 | Lord | 240/825.31 |
| 5,206,488 | 4/1993 | Teicher | 235/380 |
| 5,278,771 | 1/1994 | Nyenya | 364/492 |
| 5,347,167 | 9/1994 | Singh | 307/125 |
| 5,359,540 | 10/1994 | Ortiz | 364/492 |
| 5,369,740 | 11/1994 | Naylor | 364/140 |
| 5,393,964 | 2/1995 | Hamilton et al. | 235/381 |
| 5,396,417 | 3/1995 | Burks et al. | 364/401 |
| 5,412,189 | 5/1995 | Cragun | 235/379 |
| 5,451,755 | 9/1995 | Duval et al. | 235/381 |
| 5,491,326 | 2/1996 | Marceau et al. | 235/381 |
| 5,499,707 | 3/1996 | Steury | 194/217 |
| 5,506,790 | 4/1996 | Nguyen | 364/492 |
| 5,615,105 | 3/1997 | Tofigh et al. | 364/138 |
| 5,652,892 | 7/1997 | Ugajin | 395/750 |

Primary Examiner—Emanuel Todd Voeltz
Assistant Examiner—Tony M. Cole
Attorney, Agent, or Firm—Blakely Sokoloff Taylor & Zafman, LLP

[57] ABSTRACT

A system for interactively selecting and activating groups of electrically powered devices such as computer and computer peripheral devices. A preferred system includes computer and computer peripheral devices, an interactive video display and a controller. The computer and computer peripheral devices include a printer and at least two computers, each of the computers including a printer port. The computers include a controller interface computer which executes a controller interface software module to generate control signals including user interface control signals. The video display receives the user interface control signals and, in response to the signals, interactively prompts a user to provide user inputs to the controller interface computer. The user inputs include a designation of a selected group of devices from the plurality of electrically powered devices. The controller includes circuitry adapted to provide power to the selected group of devices and to selectively provide communication links between the electrically powered devices, such as a communication link between one of the printer ports and the printer, as determined by the control signals. A preferred system allows more than one user to simultaneously select, activate and use groups of electrically powered devices. The preferred system additionally includes mechanisms for receiving prepayment from the users and for providing the users with receipts.

20 Claims, 10 Drawing Sheets

SYSTEM FOR INTERACTIVELY SELECTING AND ACTIVATING GROUPS OF ELECTRICALLY POWERED DEVICES

BACKGROUND OF THE INVENTION

1. Field of the Invention

The present invention relates to a system for interactively selecting and activating groups of electrically powered devices and, more particularly, pertains to a system for interactively selecting, activating and monitoring the usage of groups of electrically powered devices such as computers and computer peripheral devices and household appliances.

2. Description of the Related Art

Within the last few years, more and more retail outlets specializing in the rental of computer equipment have appeared in this country. A known approach to monitoring the usage of computers and peripheral devices is through a network such as Novell. Such an approach to monitoring the statuses of electrically powered equipment for the purpose of generating billing is deficient in that it is highly complicated, requires bidirectional communications and cannot readily be adjusted to compensate for changes in the communication interfaces and interface hardware of the monitored devices.

In addition to monitoring usage of computers and computer peripheral devices, it is desirable to be able to remotely activate and deactivate such devices. Current X10 technology employing A/C lines is deficient in that it does not provide bidirectional feedback.

Known computer rental outlets depend upon activation inputs from human employees and, therefore, operate at greater expense. Accordingly, it is also desirable to provide a system which automates the activation and deactivation of electrically powered devices. Although it is known to functionally connect an electrically powered device to a mechanism for receiving payment, the art is devoid of a self-service system which allows multiple users to simultaneously select, activate and prepay for the use of groups of electrically powered devices.

Accordingly, an object of the present invention is to provide a system which allows multiple users to simultaneously select and activate groups of electrically powered devices.

A further object is to provide a system controller which facilitates simultaneous selection by more than one user of groups of electrically powered devices, automated activation of the groups of devices after prepayment is received, automated deactivation of the devices, and automated generation of receipts for each of the users.

Another object is to provide a system including a user input mechanism in the form of an interactive, touch-sensitive video display for entering user inputs including a designation of a selected group of electrically powered devices.

Another object is to provide a control module which receives user inputs and, in response thereto, generates: control signals for driving an interactive video display, switching control signals for a power switching device, and communication link control signals for establishing communication links between electrically powered devices.

SUMMARY OF THE INVENTION

In accordance with a specific illustrative embodiment of the present invention, a system for interactively selecting and activating groups of computer and computer peripheral devices includes a plurality of user input mechanisms adapted to receive user inputs from a plurality of users. Each user input designates a selected group of devices from a plurality of computer and computer peripheral devices. The system also includes a processor adapted to receive and process the user inputs to generate control signals. The system further includes a controller adapted to provide power to the selected groups of devices as determined by the control signals.

In another aspect of the present invention, a system for interactively selecting and activating groups of computer and computer peripheral devices includes a user input mechanism including an interactive video display for entering user inputs designating a selected group of devices from a plurality of computer and computer peripheral devices. The system also includes a control module for generating the interactive video display, receiving the user inputs, and processing the user inputs to generate switching control signals. The system further includes a switching device receiving the switching control signals and selectively providing power to the selected group of devices.

In a further aspect of the present invention, a system for interactively selecting and activating groups of computer and computer peripheral devices includes a user display for providing interactive prompts. The display prompts a user to provide a user input designating a selected group of devices from a plurality of computer and computer peripheral devices including a printer and a plurality of printers, each of the computers including a printer port. The system also includes a controller with circuitry for providing power to the selected group of devices in response to the user input and for selectively providing communication links between one of the printer ports and the printer.

In a broader aspect of the present invention, a system for interactively selecting and activating groups of computer and computer peripheral devices comprises: means for interactively prompting a user to provide a user input designating a selected group of computer and computer peripheral devices; means for generating a switching control signal in response to the user input; and means for providing power to the selected group of devices in response to the switching control signal.

In another broader aspect of the present invention, a system for interactively selecting and activating groups of electrically powered devices comprises: means for interactively prompting a user to provide a user input designating a selected group of electrically powered devices; a processor adapted to generate a power switching control signal in response to the user input and to generate a communication link control signal; and a controller adapted to provide power to the selected group of devices in response to the power switching control signal and to establish communication links between the electrically powered devices in response to the communication link control signal.

In yet another broader aspect of the present invention, a system for interactively selecting and activating groups of computer and computer peripheral devices comprises: a processor adapted to facilitate selections made by at least one user of groups of devices from a plurality of electrically powered devices, to control activations of the groups of devices to monitor the activations, and to generate bills for each of the users.

In another aspect of the present invention, a system for interactively selecting and activating groups of computer and computer peripheral devices includes a plurality of computer and computer peripheral devices, a display and a controller. The devices include a printer and a plurality of computers, each of the computers including a printer port, the plurality of computers including a controller interface computer which executes a controller interface software module to generate control signals including user interface control signals. The display is responsive to the user interface control signals and is adapted to interactively prompt a user to provide user inputs to the controller interface computer. The user inputs include a designation of a selected group of devices from the plurality of computer and computer peripheral devices. The controller includes circuitry adapted to provide power to the selected group of devices and to selectively provide communication links between one of the printer ports and the printer as determined by the control signals.

In a further aspect of the present invention, the system additionally includes means responsive to the control signals for receiving a prepayment from the user.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

Figure 1:
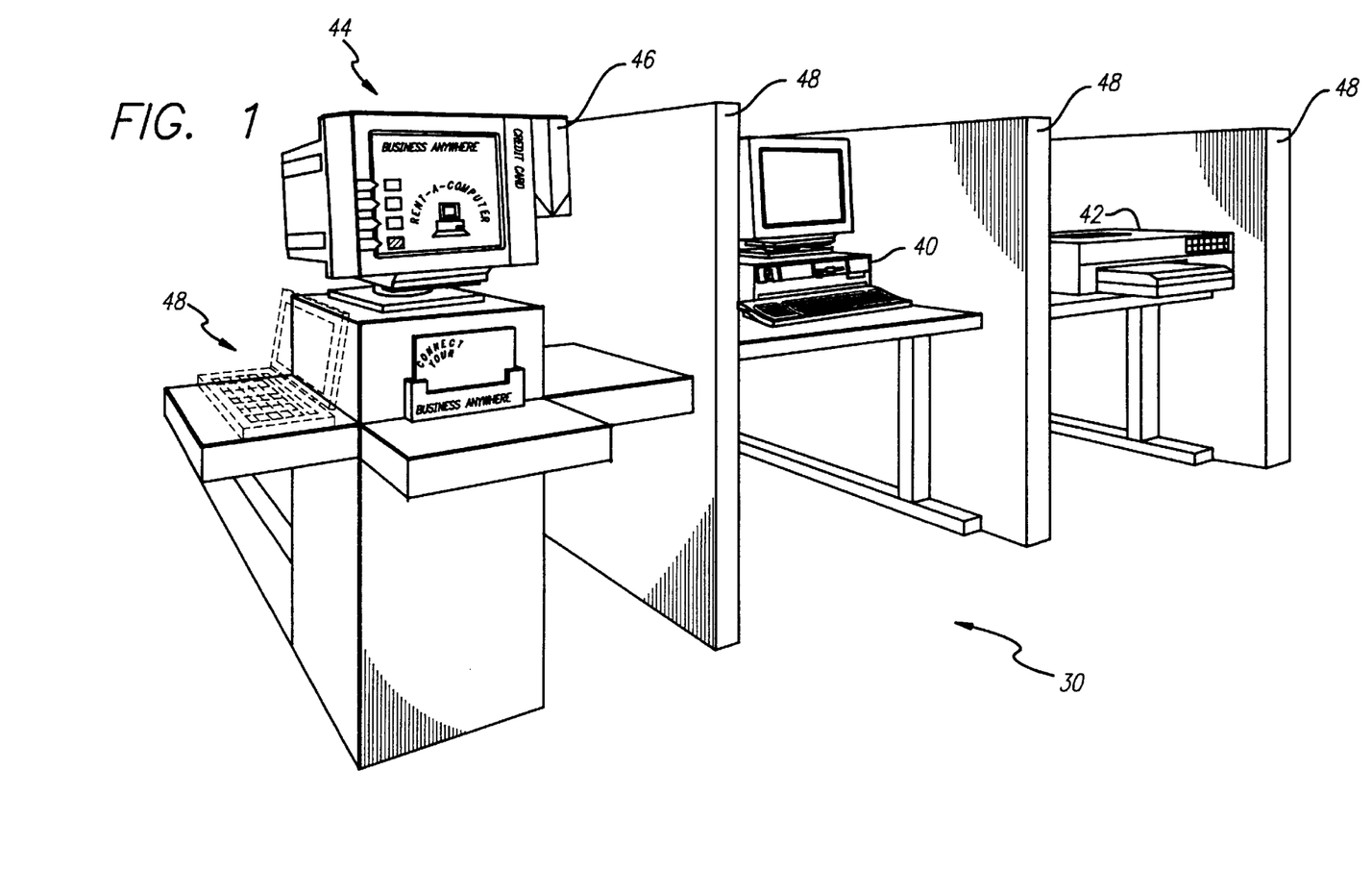
FIG. 1 is a perspective view of a system for interactively selecting, activating and monitoring the usage of groups of computers and computer peripheral devices according to the present invention.

FIG. 1 shows an exemplary preferred system 30 for interactively selecting and activating groups of electrically powered devices. The system 30 includes a plurality of computer and computer peripheral devices such as a computer 40 and a printer 42. While the exemplary preferred system 30 includes computers, computer peripherals and other devices typically found in an office, it is additionally contemplated that the groups of electrically powered devices could include home appliances such a television or coffee maker.

The system 30 additionally includes a display 44, which preferably comprises a video monitor as shown in FIG. 1. The system may also, but does not necessarily, include a means for receiving payment, such as a credit/ATM card reader 46. Alternatively, the means for receiving payment can take the form of other payment receiving mechanisms such as a coin and/or currency receiving mechanism, a fingerprint or voice recognition system linked to a database of personal or business accounts, etc.

A first key aspect of the present invention is that the system 30 provides its users with a self-service means for selecting and activating particular groups of electrical devices from a plurality of electrical devices. One or several controllers and a switching mechanism are required to implement the system 30. In the exemplary embodiment shown in FIG. 1, the display 44 presents a sequence of menus which interactively prompt a user of the system 30 to provide user inputs which, for example, designate a selected group of devices from a plurality of displayed computer and computer peripheral devices. At least one of the aforementioned controllers executes a computer executable program or programs for providing user interface control signals to the display 44. The switching mechanism also receives switching control signals generated by execution of a computer executable program by at least one of the controllers. In a preferred embodiment, a computer executable program is also employed to control a means for providing communication links between printer ports and a printer. As discussed below in greater detail, the system 30 may include additional computer executable programs providing communications interfaces to other computers, intelligent peripherals (e.g., payment receiving mechanisms), telecommunications hardware (e.g., telephones, facsimile machines).

Another key aspect of the present invention is that the system 30 also includes interconnection hardware and the communications interfaces necessary for a user to "dock" a personal computer 48 or other electrically powered device to the system 30. As discussed below in greater detail, a controller or processor of the system 30 controls a sequence of interactive visual menus presented at the display 44 thereby allowing the user to select and activate a group of electrically powered devices. More specifically, the user selects a group of "stations" (to which electrically powered devices may be, but are not necessarily, connected). In a preferred embodiment, a "station" is defined as a power outlet that the system 30 is capable of selecting and providing power to, combined with a communications interface that is controlled and accessible by a controller or processor of the system 30. For example, a user may "dock" a notebook style personal computer 48 to the system 30 by selecting the appropriate station at the display 44. The system 30 executes software which applies power to the power outlets of the selected stations and enables the communications interface at the selected stations. Preferably, the communications interface hardware at the stations comprises connectors facilitating operable connection to currently favored computers and computer peripheral devices.

The system 30 may include redundant computer and computer peripheral devices so that more than one user can simultaneously create, activate and use "custom offices". Accordingly, a system 30 intended to accommodate more than one user can have one or more display 44. The software executed by the system 30 monitors the availability of the computer and peripheral devices and provides a prospective user with an indication that a specified device is unavailable when no such device is currently available for use. As may be readily appreciated, various advanced features may be implemented including, but not limited to, allowing a prospective user to reserve the next available device of a presently unavailable type of electrically powered device. In an embodiment with a payment receiving mechanism 46, the system 30 executes software which allows more than one user to make payment at the same time.

As shown in FIG. 1, the various electrically powered devices may be positioned in distinct areas separated by partition members 48. As may be readily appreciated, the computer and computer peripheral devices are preferably segregated in a manner which anticipates typically selected combinations of office equipment.

Figure 2:
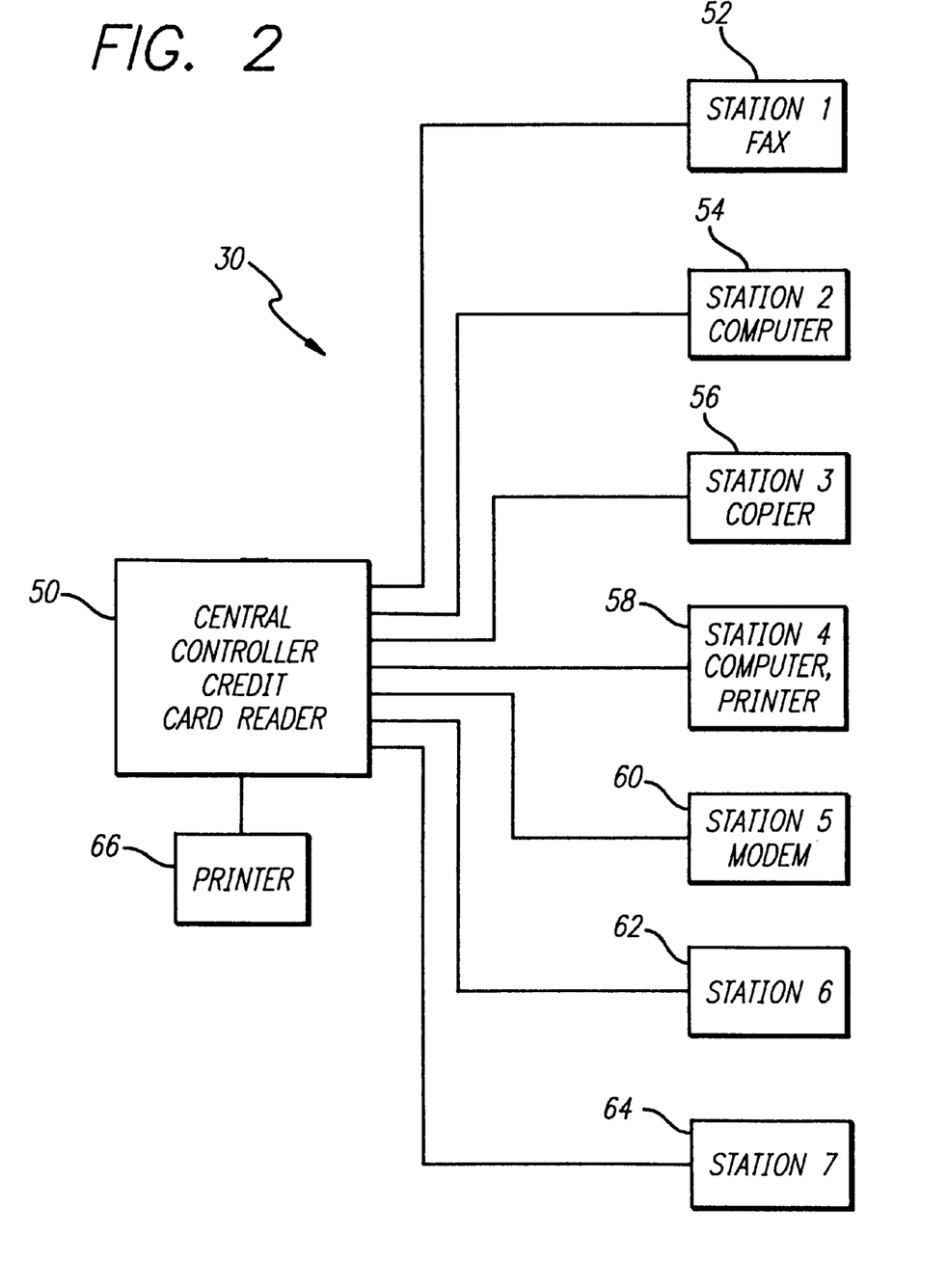
FIG. 2 is a block diagram showing the functional relationship between the central controller and a plurality of stations adapted to receive electrically powered devices.

FIG. 2 is a block diagram showing the functional relationship between a central controller 50 and a plurality of stations adapted to receive electrically powered devices. By way of example, the central controller 50 is functionally interconnected to a station 52 and is adapted to provide power and a communication link to a facsimile machine. As shown in FIG. 2, the central controller 50 provides power and communications interfaces to a station 54 which, for example, is adapted to receive a controller interface computer. A station 56 is similarly controlled by the controller 50 which determines when power is made available to a copier and provides a communication link to the copier. A station 58 can, for example, provide power and communications links to an electrically interconnected computer and printer which have been configured to be used together. A station 60 is similarly configured to provide power and communications links to a modem. Additional stations such as stations 62, 64 can also be included in the system 30. The stations 62, 64 allow other computer and computer peripheral devices to be docked to and used with the system 30.

In a preferred embodiment, the central controller 50 additionally supports the system task of determining whether or not payment has been made by a prospective user of the system. For example, the central controller 50 preferably receives inputs from a credit card reader. As shown in FIG. 2, a printer 66 is also electrically connected to the preferred controller 50. The printer 66 may be designated as a dedicated printer which, for example, receives control signals from the central controller 50 and is only used to print receipts for payment or prepayment by the user.

Figure 9:
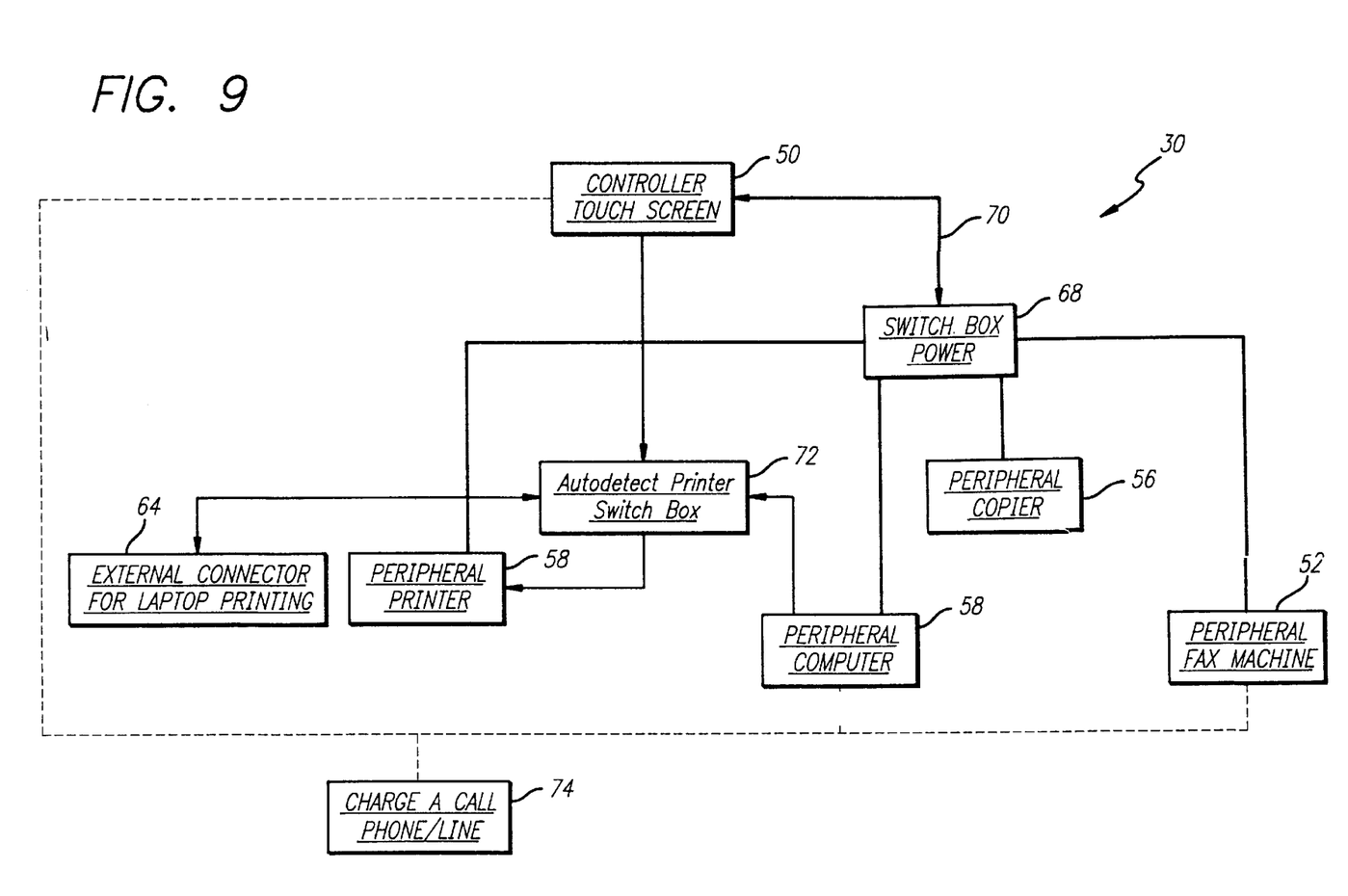
FIG. 9 is a functional block diagram of an alternative embodiment of the system 30.

FIG. 9 is a functional block diagram of an alternative embodiment of the system 30. In the illustrated preferred embodiment, the controller 50 provides user interface control signals to a touch screen display. The system 30 also includes a switch box 68 which receives switching control signals from the controller 50 along control signal path 70. As shown in FIG. 9, the system 30 also includes a connection link switch box 72 which, for example, selectively provides communication links between one of the printer ports (of the controller 50 and the peripheral computer at station 58) and the peripheral printer at station 58. The operational aspects of the switch boxes 68, 72 are discussed below in greater detail. It should also be appreciated that the two switch boxes 68, 72 can be configured within a single switch box. As discussed above, the controller 50 can also be adapted to support various telephonic data communication interfaces such as a charge-a-call phone line interface 74, a coinless payphone equivalent.

Figure 3:
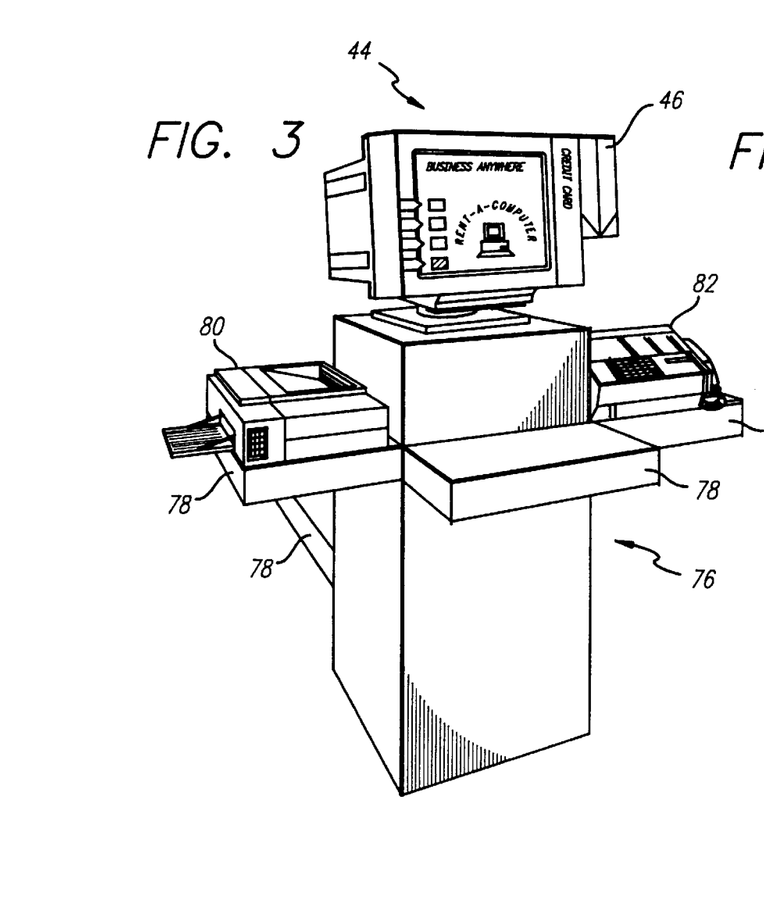
FIG. 3 is a front perspective view of a stand-alone embodiment of the system for interactively, activating and monitoring the usage of selected computer and computer peripheral devices.
Figure 4:
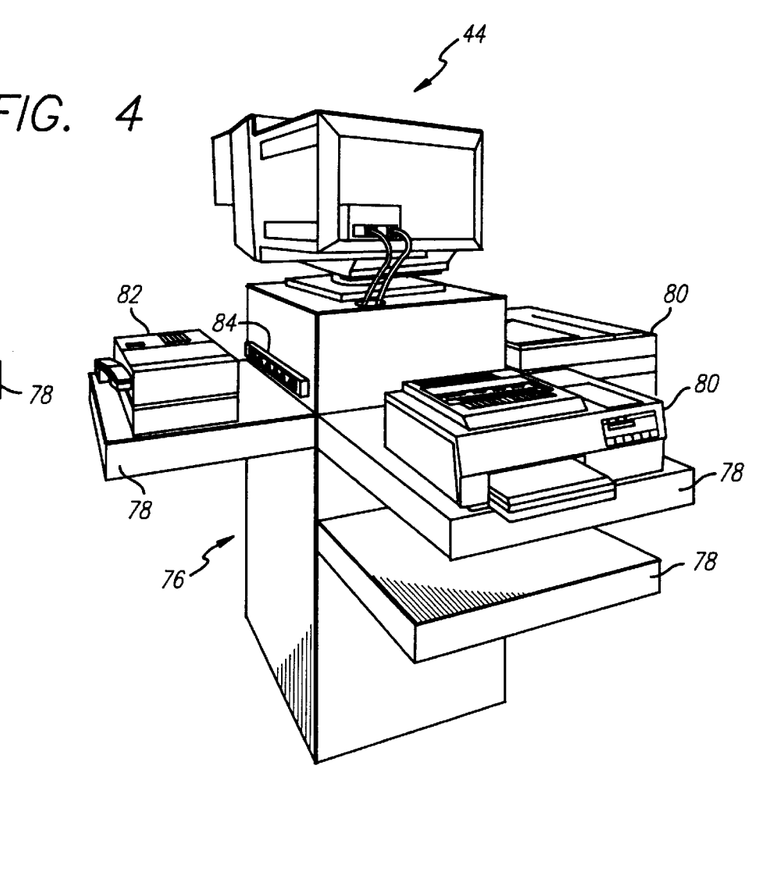
FIG. 4 is a rear perspective view of the system shown in FIG. 3.

FIG. 3 is a front perspective view of a stand-alone embodiment of the system 30. FIG. 4 is a rear perspective view of the system shown in FIG. 3. The stand-alone version of the system includes a pedestal unit 76 with a plurality of shelves 78 upon which computer peripheral devices are placed. The processor 50 and switch boxes 68, 72 can be physically positioned within the pedestal unit 76 or, alternatively, remotely located. Exemplary computer peripheral devices include laser printers 80 and a facsimile machine 82. As seen in FIG. 4, the system 30 includes a power strip 84 which is electrically connected to and controlled by the switch box 68. Alternatively, the power strip 84 may be positioned within the pedestal unit 76 or at some other location which is not readily accessible by users. Although the stand-alone unit is shown in a kiosk configuration, it should be appreciated that other types of furniture, equipment bays, etc., may be employed particularly if the computers and computer peripheral devices need to be more optimally secured to prevent their theft or attempts by users to manually override control signals from the controller 50.

Figure 5:
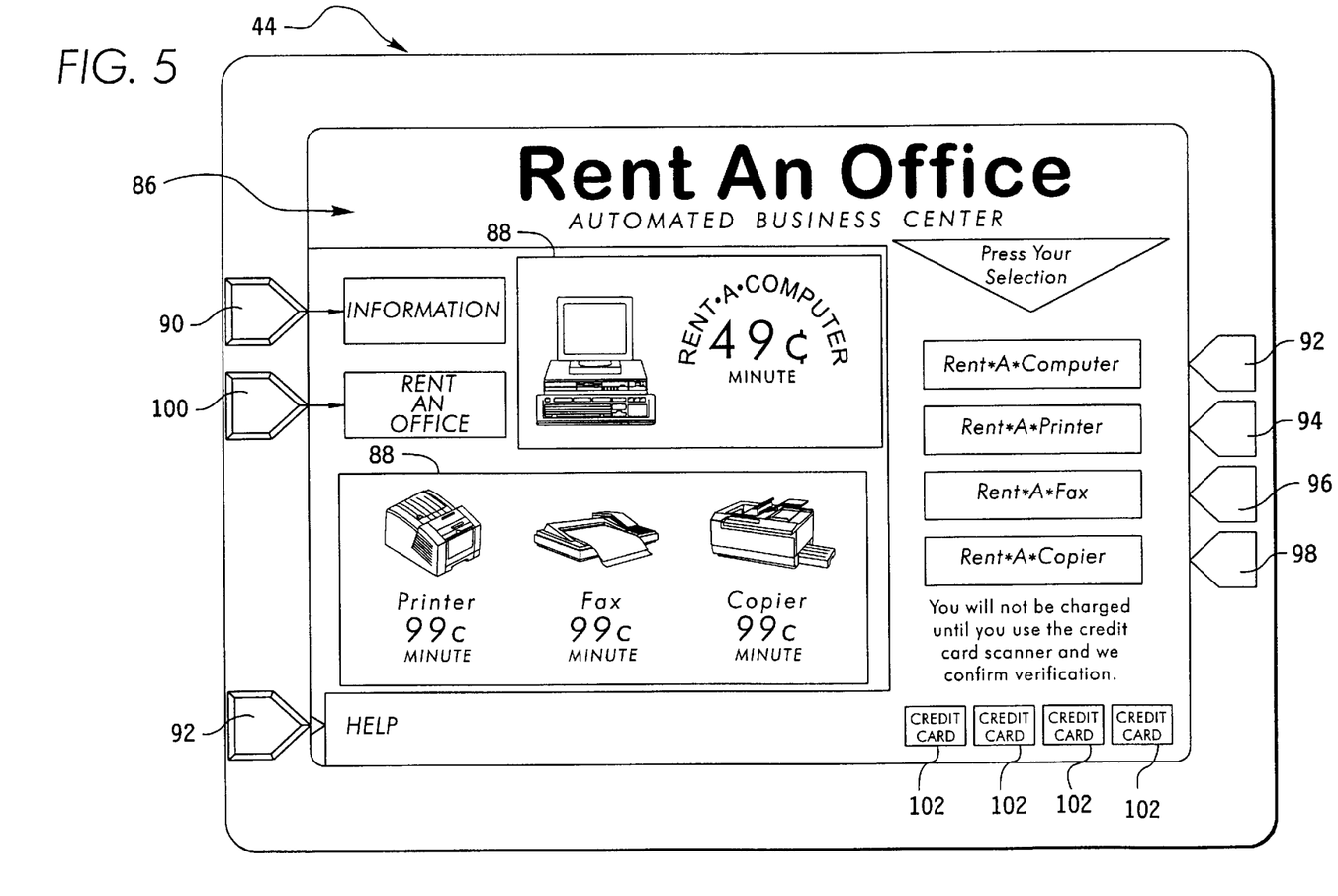
FIG. 5 shows the interactive user interface of the present invention.

As best seen in FIG. 5, an interactive user interface is presented at the display 44. A main menu display 86 is first presented to a prospective user of the system 30. The user interface control signals initiate a sequence of interactive displays. The interactive displays include various fields providing information or facilitating user inputs. A preferred means for receiving user inputs is a touch screen as shown in FIG. 5. Information display fields 88 can, for example, be employed to provide a prospective user with information about the cost per minute for using various computer and computer peripheral devices. An information icon 90 initiates execution of computer executable programs which provide the user with information relevant to selected or indicated aspects of the system 30. Similarly, a help icon 92 is presented to the user and initiates the execution of an executable program or programs which provide a user with additional information explaining how devices are selected, activated, prepayment is made, receipts obtained, etc.

In an exemplary system 30, the available computer and computer peripheral devices preferably include a computer, printer, facsimile machine and copier. These electrically powered devices are respectively selected by pressing device selection icons 92, 94, 96, 98. The preferred main menu screen 86 additionally includes a device selection icon 100 which, when depressed by a user, initiates activation of a computer, printer, facsimile machine and copier—as if all of the device selection icons 92, 94, 96, 98 had been depressed. The preferred main menu screen 86 additionally includes credit card designation icons 102 which facilitate payment or prepayment by the user.

Figure 6A:
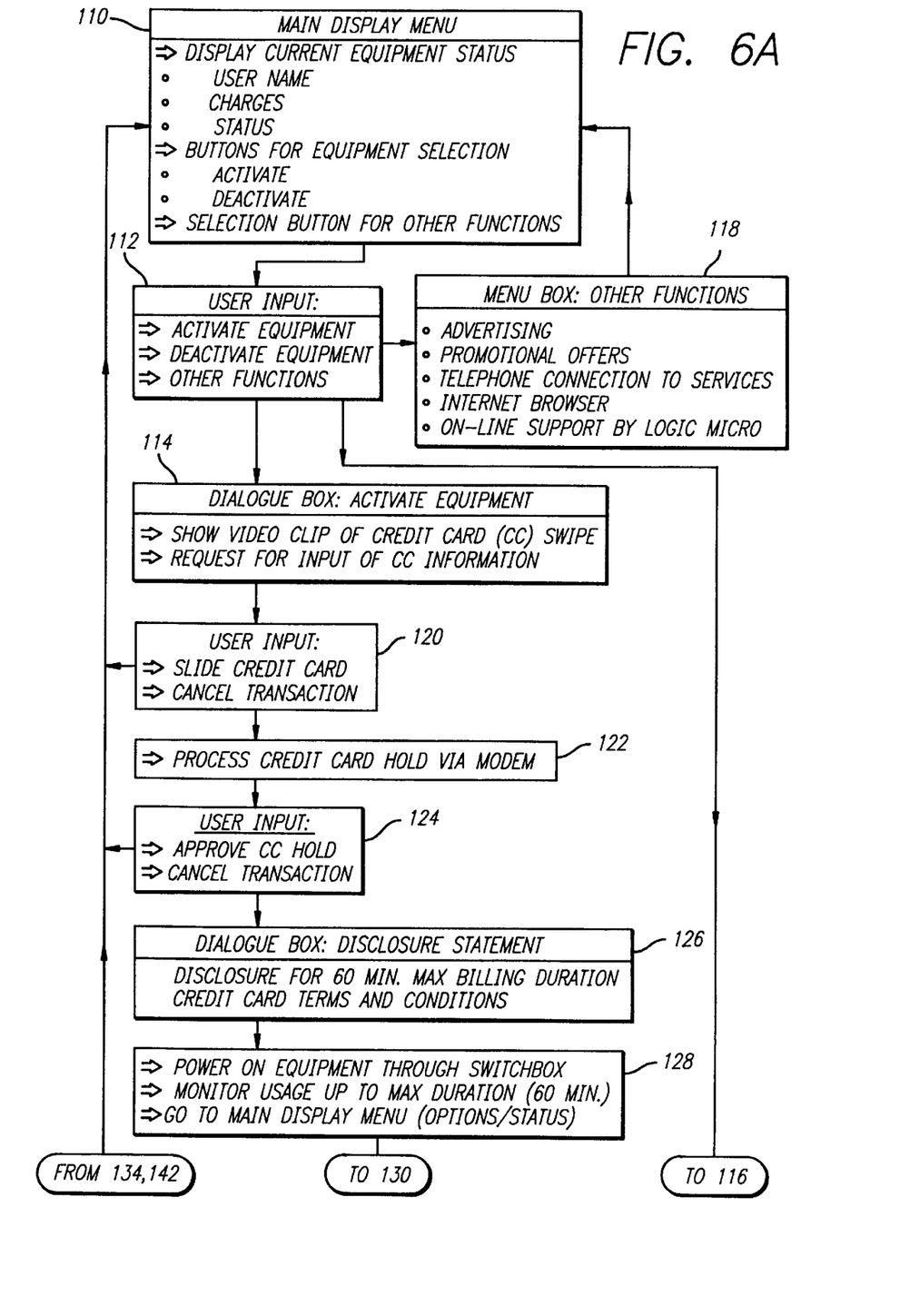
FIGS. 6A and 6B show an operational flowchart of a controller interface software module according to a preferred embodiment of the present invention.
Figure 6B:
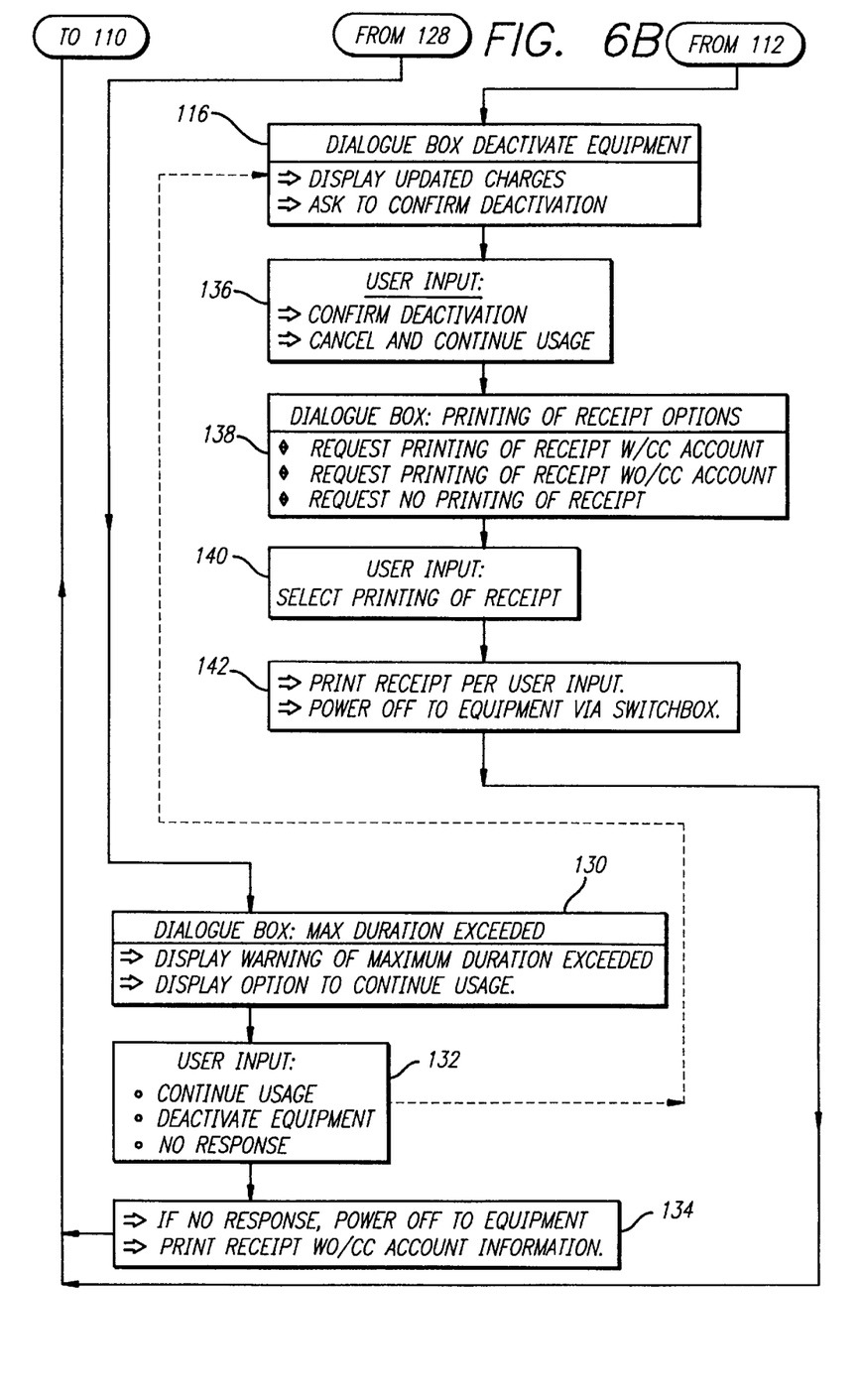

FIGS. 6A and 6B show an operational flowchart of a controller interface software module according to a preferred embodiment of the present invention. A main display menu executable block 110 facilitates the display of currently entered user information, accrued charges and operational status information of the various computer and computer peripheral devices. Additionally, executable block 110 provides for the responsivity of portions of the touch screen for the purpose of selecting electrically powered devices for activation or deactivation.

Executable block 112 responds to user inputs. If the user provides an "activate equipment" input, the executable program is redirected toward executable block 114. If the user provides a "deactivate equipment" input, the executable program is redirected toward executable program block 116 (FIG. 6B). Additionally, a user may provide an "other functions" input. In response to such an input, the executable program is redirected toward executable program block 118 as shown in FIG. 6A. The "other functions" menu block 118 can be programmed to provide a variety of advertising displays, promotional offers and telephone and interconnect connections and services as well as on-line support features.

Another key aspect of the present invention is that the system 30 is configured to operate as a self-service facility. As such, sufficient information must be provided to prospective users. When execution of the "activate equipment" executable block 114 is initiated, a brief video clip illustrating how a credit card is used to prepay is shown to the user. In addition or alternatively, the controller interface computer requests the user to input credit card information such as the account number and expiration date.

As shown in FIG. 6A, the controller 50 processes the next user input at executable block 120 which either receives the credit card information entered or cancels the transaction depending upon the user input. If the transaction is cancelled, the executable program is redirected to the "main display menu" executable block 110. If the user elects to continue with the transaction, the executable program is redirected to a "process credit card hold via modem" executable block 122. At a "user input" executable block 124, the user is given an opportunity to approve charging the transaction to the credit card after the transaction has been approved or to cancel the transaction. After a user approves a transaction, a "disclosure statement" executable block 126 controls the display of pertinent limitations and other information to the user. For example, information may be provided to the user that a selected computer or computer peripheral device may only be reserved for up to one hour. Other displays may also be presented such as credit card terms and conditions and disclosures or other information that should or must (required by an applicable law or regulation) be presented to the user.

After the disclosure statement is presented to the user, the executable program is redirected to an executable program block 128 which controls the generation of control signals including switching control signals which are provided to the switch box 68. In a preferred embodiment, the control signals additionally include communication link control signals which, for example, are provided to the switching box 72 to establish communication links between the various electrically powered devices. The executable block 128 additionally monitors usage of the activated computer and computer peripheral devices. The usage is monitored so that the users are appropriately billed after the electrically controlled devices are deactivated and to assure that any predetermined usage limitations such as a maximum time duration are not exceeded.

With reference to FIG. 6B, a "maximum duration exceeded" executable block 130 displays a warning when the maximum duration has been exceeded and, in a preferred embodiment, also displays an option to continue usage. A "user input" executable block 132 redirects the executable program depending upon the user input provided. If the user provides an input indicating a desire to continue using the electrically powered devices, the user is prompted to verify previous inputs and/or provide additional user inputs and the activated devices remain activated or are reactivated as the case may be. As may be readily appreciated, the controller interface software module could also be programmed to provide users with options to add or delete various peripheral devices when a usage session comes to an end or prior to that time. The equipment usage monitoring feature may result in the recordation of the exact amount of time any particular computer or computer peripheral device is activated, round to a nearest minimum time unit (e.g.,10 minutes) or simply bill a user for an amount of time no less than the amount of time reserved and no greater than the maximum amount of time allowed.

If a session comes to an end and a user fails to provide a response, the executable program is redirected toward executable block 134 which generates the appropriate switching control signals to deactivate or disconnect power sources. It should be appreciated that the deactivated power sources are those which are connected to computer and computer peripheral equipment previously activated by the particular user who has failed to respond. The controller software may be programmed to provide the user with a predetermined amount of time to respond (e.g., one minute) before power is removed from the equipment. In a preferred system 30, a usage session is prepaid so that human system attendants are unnecessary. Furthermore, prepayment makes it convenient for a user to rapidly terminate a session and receive a receipt without having to wait for credit card approval, credit line verification or the like. At executable block 134, the receipt is printed without account information to protect a user who is suddenly called away from a usage session.

When a user provides a "deactivate equipment" input, the executable program is directed toward the executable block 116 as shown in FIG. 6B. After the executable block 116 is initiated, the controller 50 calculates and sends control signals facilitating the display of updated charges. The user is also asked to confirm that deactivation is desired. After the user responds to the request for deactivation confirmation, an executable block 136 either confirms deactivation or cancels the request for deactivation and redirects the executable program such that device usage will continue.

When the user provides an input confirming deactivation, a "printing of receipt options" executable block 138 is initiated. The executable block 138 preferably presents the user with the option of receiving a receipt with or without personal account information or, alternatively, the option of receiving no receipt. The user's response is processed by a "user input" executable block 140 after which the executable program is redirected to an executable block 142 as shown in FIG. 6B. The executable block 142 controls the printing of receipts and thereafter sends control signals to remove power from the appropriate electrically powered devices via the switch box 68.

Figure 7A:
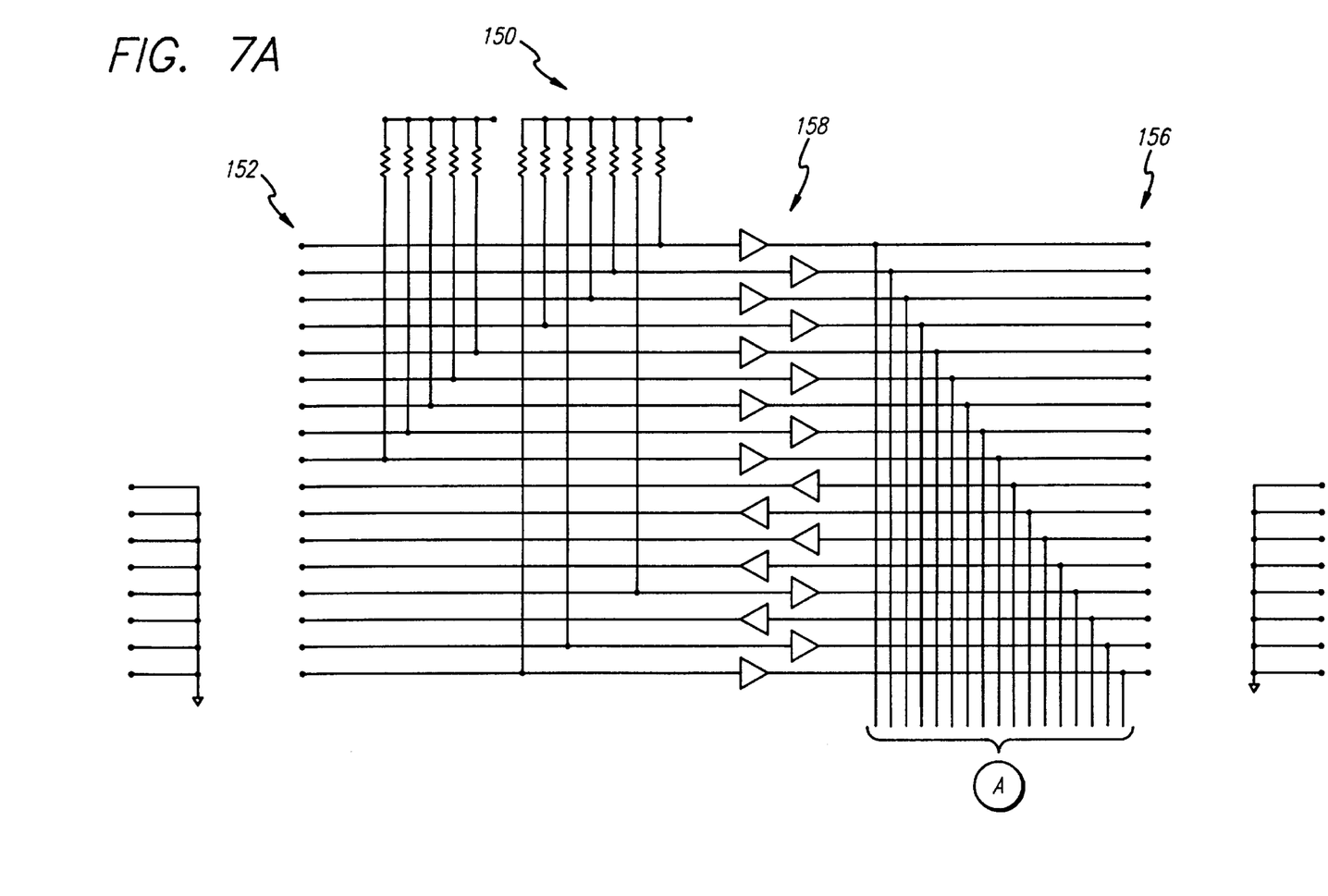
FIGS. 7A and 7B show an electrical schematic of the communication link circuitry of a preferred interactive electrical device selecting and activating system.
Figure 7B:
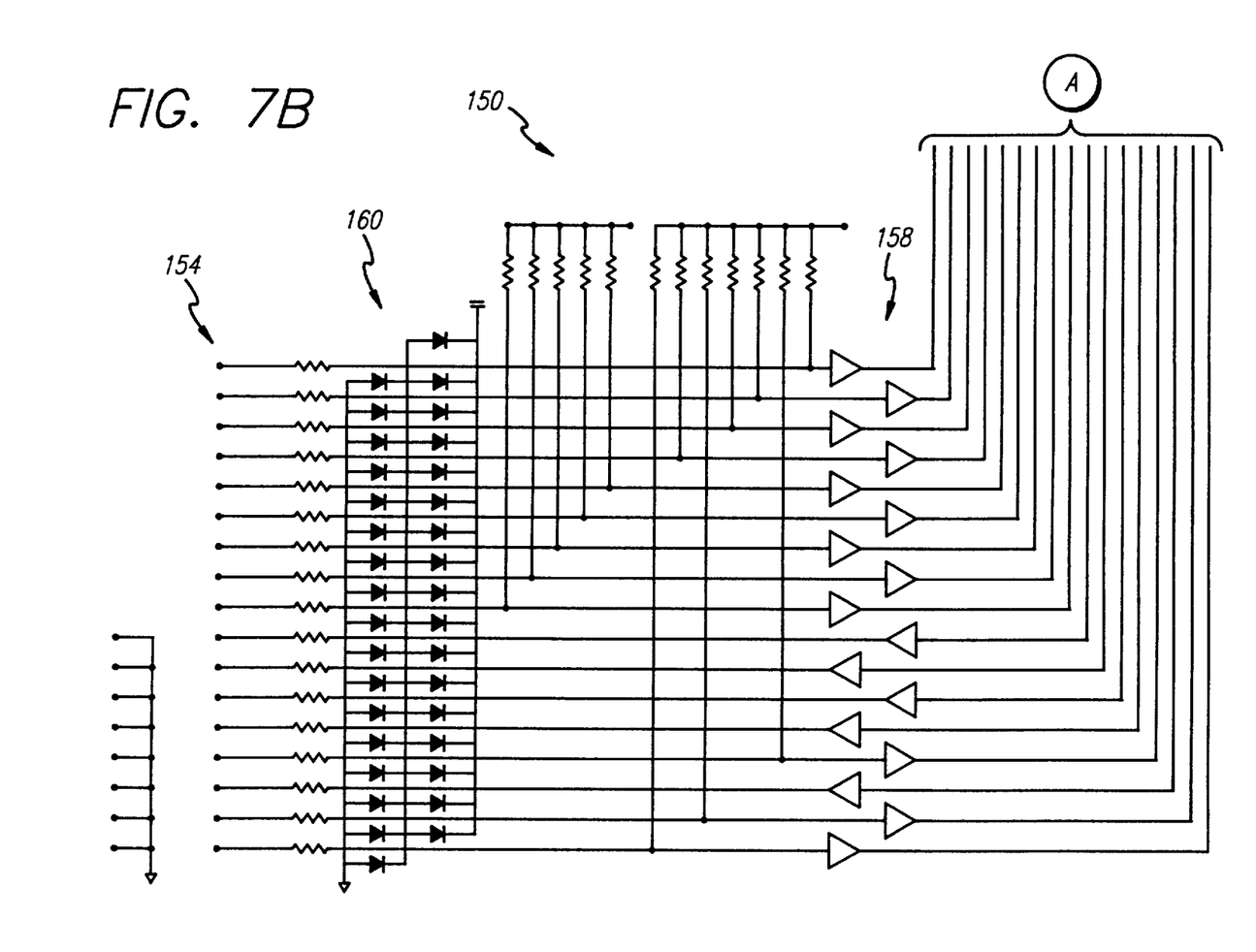

FIGS. 7A and 7B show an electrical schematic of communication link circuitry 150 of a preferred system 30. The communication link circuitry 150 may be, but is not necessarily, located within the switch box 72 (FIG. 9). Generally, the communication link circuitry 150 acts as a switch determining which of several communications ports is electrically connected to a peripheral device such as a printer. Referring again to FIG. 9, the controller 50 and the peripheral computer at station 58 both include printer ports. The peripheral printer at station 58 is connected to one of the aforementioned printer ports via the communication link circuitry 150. Parallel printer port connections 152 (FIG. 7A) and parallel printer port connections 154 (FIG. 7B) are respectively connected to two different computers such as the controller 50 and the peripheral computer at station 58 via currently favored connection hardware, e.g., conventional 25-pin D-connectors. Parallel printer port connections 156 (FIG. 7A) are connected, for example, to the peripheral printer at station 58 (FIG. 9). Referring again to FIGS. 7A and 7B, the unidirectional buffer circuitry 158 may be replaced with bidirectional relay circuitry to facilitate bidirectional communications. Referring to FIG. 7B, protection circuitry 160 may also be included.

Figure 8:
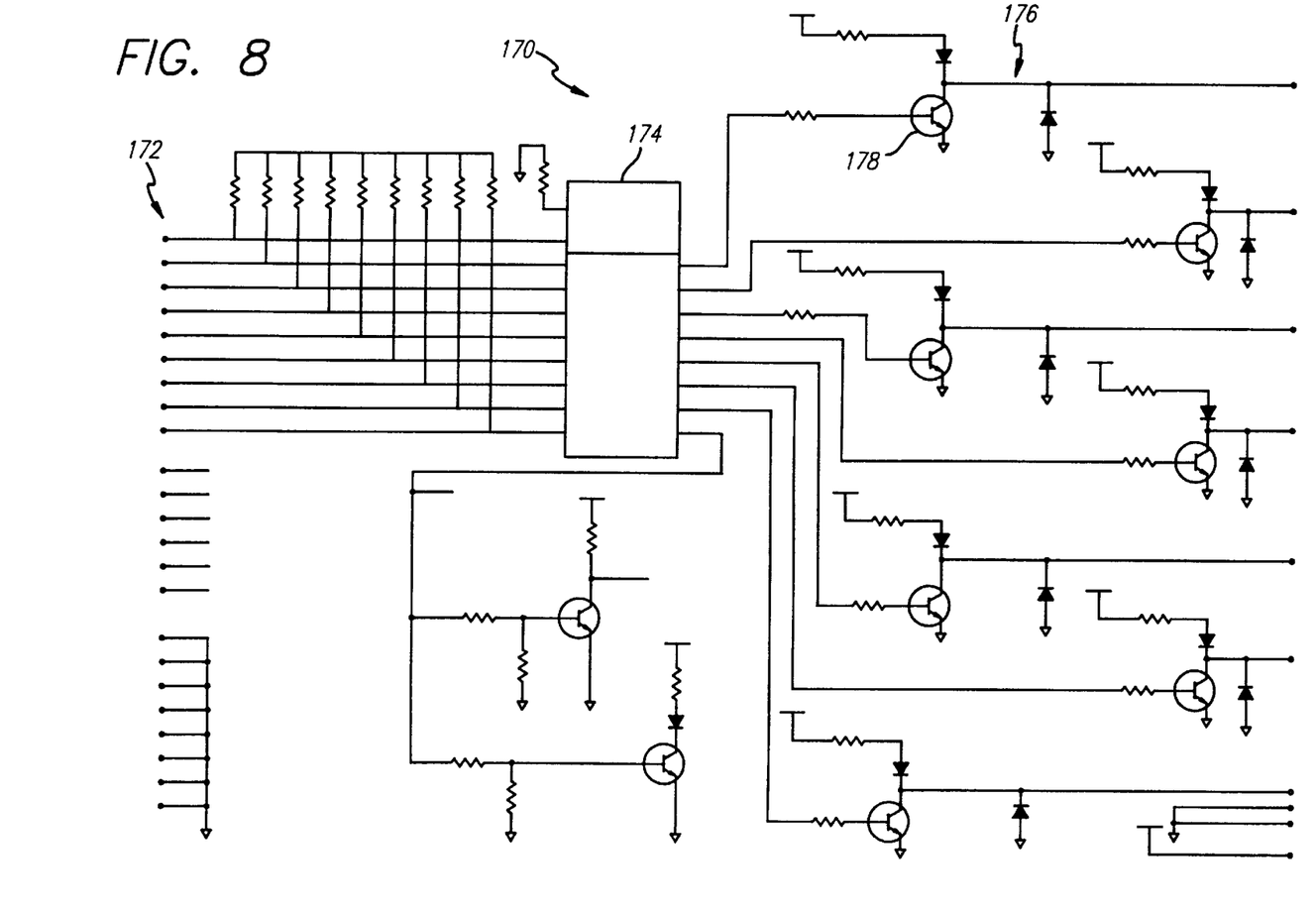
FIG. 8 shows an electrical schematic of the switching control circuitry of a preferred interactive electrical device selecting and activating system.

FIG. 8 shows an electrical schematic of switching control circuitry 170 according to a preferred system 30. Connections 172 are electrically connected to a control port of the controller 50. In a preferred embodiment, 8 bits of data are provided to the connections 172 at a printer port of the controller 50 which has been programmed to function as a control port. The 8 bits of data are provided to a data latch integrated circuit 174 which, for example, comprises a standard 74LS373 integrated circuit chip. The outputs of the data latch integrated circuit 174 are provided to analog transistor circuitry 176 which provide inputs to relays (not shown) for controlling the activation and deactivation of the stations. The individual transistors 178 comprise, for example, a conventional 2N2222 transistor. As shown in FIG. 8, light emitting diodes (LEDs) may be provided if desired.

In conclusion, it is to be understood that the foregoing detailed description and the accompanying drawings illustrate the principles of the invention. However, various changes and modifications may be employed without departing from the spirit and scope of the invention. Thus, by way of example and not of limitation, it is contemplated that a power usage monitoring could also be employed to provide additional feedback to the system controller. Accordingly, the present invention is not limited to the specific form shown in the drawings and described in detail hereinabove.

What is claimed is:

1. A system comprising:
    a plurality of computer and computer peripheral devices including a printer and a plurality of computers, each of the computers including a printer port, the plurality of computers including a controller interface computer which executes a controller interface software module to generate control signals including user interface control signals;
    a display responsive to the user interface control signals and adapted to interactively prompt a user to provide user inputs to the controller interface computer, the user inputs including (i) a designation of a selected group of devices from the plurality of computer and computer peripheral devices and (ii) a prepayment method designation; and
    switching control circuitry directly connected to each of the plurality of computer and computer peripheral devices through corresponding dedicated unidirectional communication lines, the switching control circuitry to control usage through deactivation of the selected group of devices and to selectively provide direct communication links between one of the printer ports and the printer as determined by the control signals.

2. A system comprising:
    a plurality of computer and computer peripheral devices including a printer and a plurality of computers each of the computers including a printer port, the plurality of computers including a controller interface computer which executes a controller interface software module to generate control signals including user interface control signals;
    a display responsive to the user interface control signals and adapted to interactively prompt a user to provide user inputs to the controller interface computer, the user inputs including (i) a designation of a selected group of devices from the plurality of computer and computer peripheral device;
    switching control circuitry directly connected to each of the plurality of computer and computer peripheral devices through corresponding dedicated unidirectional communication lines, the switching control circuitry to control usage through deactivation of the selected group of devices and to selectively provide direct communication links between one of the printer ports and the printer as determined by the control signals: and
    means responsive to the control signals for receiving a prepayment from the user.

3. A system comprising:
    a plurality of computer and computer peripheral devices;
    a plurality of user input mechanisms adapted to receive user inputs from a plurality of users, each user input designating at least one of the plurality of computer and computer peripheral devices;
    a processor adapted to receive and process the user inputs to generate control signals in response to receipt of an approval of a financial transaction initiated by one of the user inputs; and
    a controller directly connected to each of the plurality of computer and computer peripheral devices through corresponding dedicated communication lines, the controller to control usage of the at least one of the plurality of computer and computer peripheral devices as determined by the control signals.

4. The system of claim 3 wherein the user input mechanisms comprise video monitors with touch-responsive screens.

5. The system of claim 4 wherein the video monitors present interactive displays to the users in response to the control signals.

6. The system of claim 3 wherein the user input mechanisms comprise a graphical pointer user input mechanism.

7. The system of claim 3 wherein the user input mechanisms comprise a push-button user input mechanism.

8. The system of claim 3 wherein the user input mechanisms comprise a trackball user input mechanism.

9. The system of claim 3 wherein the user input mechanisms comprise a mouse user input mechanism.

10. The system of claim 3 wherein the user input mechanisms comprise a voice-activated user input mechanism.

11. A system for interactively selecting and activating groups of computer and computer peripheral devices comprising:
    a user input mechanism including an interactive video display for entering user inputs designating a selected group of devices from a plurality of computer and computer peripheral devices;
    a control module for generating the interactive video display, receiving the user inputs, and processing the user inputs by establishing communication with a remotely located device to request approval of a financial transaction and generating switching control signals in response to receiving approval; and
    a switching device receiving the switching control signals and selectively providing power to the selected group of devices through corresponding dedicated communication lines.

12. A system for interactively selecting and activating groups of computer and computer peripheral devices comprising:
    a display for interactively prompting a user to provide a user input designating a selected group of devices from a plurality of computer and computer peripheral devices including a printer and a plurality of computers, each of the computers including a printer port; and
    a controller including circuitry for processing the user input by establishing communication with a remotely located device to request approval of a financial transaction for controlling usage of the selected group of devices and for selectively providing communication links between one of the printer ports and the printer in response to receiving approval.

13. The system of claim 12 further comprising:

means responsive to a payment for usage of the selected group of devices, said means generating a receipt.

14. The system of claim 13 wherein the means for generating a receipt includes a printer.

15. The system of claim 13 wherein the means for generating a receipt includes a facsimile machine.

16. A system for interactively selecting and activating groups of electrically powered devices comprising:

means for interactively prompting a user to provide a user input designating a selected group of electrically powered devices;

processor means for processing the user input to generate a power switching control signal and alternatively to generate a communication link control signal in response to receipt of an approval of a financial transaction initiated by the user input; and control means for controlling usage of the selected group of devices in response to the power switching control signal and to establish communication links between the electrically powered devices in response to the communication link control signal.

17. The system of claim 16 wherein the control means is adapted to provide power to computer and computer peripheral devices.

18. The system of claim 16 wherein the control means is adapted to provide power to home appliances.

19. The system of claim 16 wherein the control means is adapted to provide power to home appliances including a television.

20. The system of claim 16 wherein the control means is adapted to provide power to home appliances including a coffee maker.

* * * * *